(12) United States Patent
Howell et al.

(10) Patent No.: US 7,032,965 B2
(45) Date of Patent: Apr. 25, 2006

(54) FOLDABLE SHOOTING CHAIR

(76) Inventors: Larry D. Howell, 804 West Harrison Dr., Longview, TX (US) 75644; Shawn Schrecengost, 5304 Lookout La., Gilmer, TX (US) 75644

( * ) Notice: Subject to any disclaimer, the term of this patent is extended or adjusted under 35 U.S.C. 154(b) by 0 days.

(21) Appl. No.: 10/923,069

(22) Filed: Aug. 20, 2004

(65) Prior Publication Data
US 2006/0038434 A1  Feb. 23, 2006

(51) Int. Cl.
*A47C 4/00* (2006.01)
*A47C 1/02* (2006.01)
*A47C 7/62* (2006.01)

(52) U.S. Cl. .............. 297/16.1; 297/344.21; 297/188.21; 297/411.29

(58) Field of Classification Search ............. 297/16.1, 297/51, 344.21, 188.01, 188.21, 411.29, 411.35; 42/94; 248/425
See application file for complete search history.

(56) References Cited

U.S. PATENT DOCUMENTS

| | | | | |
|---|---|---|---|---|
| 693,685 | A | * | 2/1902 | Case ..................... 297/344.21 |
| 728,454 | A | * | 5/1903 | Flannery et al. ............ 248/596 |
| 2,228,179 | A | * | 1/1941 | Motley ..................... 89/37.03 |
| 4,535,559 | A | * | 8/1985 | Hall .............................. 42/94 |
| 4,645,167 | A | * | 2/1987 | Hardwick ................... 248/520 |
| 4,937,965 | A | * | 7/1990 | Narvaez ......................... 42/94 |
| 5,060,410 | A | * | 10/1991 | Mueller ......................... 42/94 |
| 5,110,181 | A | * | 5/1992 | Simjian ...................... 297/185 |
| 5,149,900 | A | * | 9/1992 | Buck ............................. 42/94 |
| 5,567,014 | A | * | 10/1996 | Fitch ..................... 297/344.21 |
| 5,688,024 | A | * | 11/1997 | Arizpe-Gilmore ....... 297/217.1 |
| 6,269,578 | B1 | * | 8/2001 | Callegari ....................... 42/94 |

* cited by examiner

*Primary Examiner*—Peter M. Cuomo
*Assistant Examiner*—Sarah B. McPartlin

(57) ABSTRACT

A foldable shooting chair that will provide a sturdy support for a long gun shooter and includes a tripod base with legs that will fold together. A stool, including a padded seat rotatably mounted on the base and a seat back, support arm and shooting arm carried by and rotatable with the padded seat, the support arm being removable for positioning as a support for either a right or left-handed shooter and as a handle when the tripod legs are folded together.

9 Claims, 8 Drawing Sheets

FOLDABLE SHOOTING CHAIR

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

This invention relates to shooting chairs used by persons firing guns, and particularly, shooting long guns.

2. Prior Art

Shooting chairs have been used for years. Generally, the chairs have supporting legs, a seat, and a support arm that will support the muzzle end of a gun being fired. The known shooting chairs are generally made of heavy metal or wood materials, so that they will remain very stable during firing. For the most part, such shooting chairs have been used on shooting ranges and at target practice areas to allow a shooter to "sight-in" his gun. While any gun can be fired while sitting on the shooting chair, the chair is most often used during the firing of rifles or other long guns.

Known shooting chairs have not been easily transported from one area of use to another area of use. Consequently, the stable shooting chairs have generally not been used in the field when hunting animals, or they have been placed in a field location and left at that location. This is due not only to the weight and bulkiness of the shooting chairs, but also because they often do not include any means for easily changing the height and direction of the support arm for the muzzle end of the gun when it is used in the field, to shoot at an animal.

THE INVENTION

While the known shooting chairs may be very successfully used for competition shooting, target practice and for sighting in a gun, they are not suitable to be moved from one target practice area to another or to a position in the field. This is particularly true when the user cannot use a vehicle to carry the shooting chair and must carry the shooting chair, by hand, into the field for use in the shooting of game. The shooting chair of the invention is particularly adaptable to provide a stable chair that is easily folded and carried from area to area and that, when set up for use, will allow for a wide field of fire and ready adjustability of the height of the muzzle of a gun.

OBJECTS OF THE INVENTION

Principal objects of the present invention are to provide a shooting chair that will be stable, easily transported, even carried by hand, and that can be set-up for use at a target range or in the field in a minimum amount of time and with a minimum amount of effort.

Another object of the invention is to provide a shooting chair that when folded to be carried, has handle means that will provide for balanced carrying, even as a person carrying the shooting chair travels over irregular terrain.

Other objects of the invention are to provide a shooting chair that is foldable to be compactly carried by hand and that, when set-up, will provide a stable sitting base with an adjustable shooting arm that can be raised or lowered and rotated to allow the shooter to have a large field of fire.

FEATURES OF THE INVENTION

References herein to "upper," "top", "lower", and "bottom" areas and components, as used throughout the specification, refer to locations existing when the foldable shooting chair 10 is set up for use.

Principal features of the shooting chair of the invention include a stool having a padded seat rotatably mounted with respect to tripod legs and a support arm having a seat back and an arm rest. A shooting arm is mounted to the padded seat and rotates with the seat, relative to the legs of the stool.

The shooting arm is mounted to be raised and lowered relative to the padded seat and the shooter sits on the padded seat and straddles the shooting arm. The shooter raises or lowers the shooting arm to provide the desired height support for the muzzle end of the gun to be fired.

The support arm is mounted on a back support post on which the seat back is mounted and extends outwardly and forwardly of the padded seat. A cushioned arm rest is mounted to be positioned along one side or an opposite side of a forwardly extending portion of the support arm. The choice of positioning of the cushioned arm rest is determined by whether the shooting chair is set up for a right handed shooter or a left handed shooter. The support arm is removed from a set-up shooting chair and is repositioned to become a carrying handle that will balance the load weight of the folded shooting chair, as it is carried.

The tripod legs are mounted beneath the cushioned seat and are mounted to swing together during folding movement of the shooting chair and to be spread apart and rigidly locked into place when positioned to support the padded seat. The padded seat has a central fixed nut on a base thereof and a hole through the seat, allowing insertion of a threaded bolt into the nut. The legs are secured to the interiorly threaded shaft by a bolt threaded into the shaft. The bolt extends through upper and lower washers and through a central tube, to which one leg is affixed, before being threaded into the nut on the seat base. Each of the other legs is connected to the central tube by top and bottom flanges that have holes therein through which the bolt is passed.

The upper flange of each other leg is positioned between the central tube and the upper washer and the lower flanges of the other legs each extend to between the lower washer and the bottom of the central tube. The flanges of the other legs swing into engagement with the one leg when the shooting chair is folded. The folding legs are thus positioned to be at a side of the central tube opposite to a leg, having a support foot, that projects from the central tube.

The support foot projects from the central tube at the side of the central tube opposite to the connection of the one leg to the central tube to rest upon the ground when the shooting chair is in its folded condition. When resting on the support foot, the repositioned support arm has a bend therein that extends upwardly to serve as a carrying handle, to be easily grasped by a user.

Additional objects and features of the invention will become apparent to persons skilled in the art to which the invention pertains from the following detailed description, drawings and claims.

DETAILED DESCRIPTION

Figure 1:
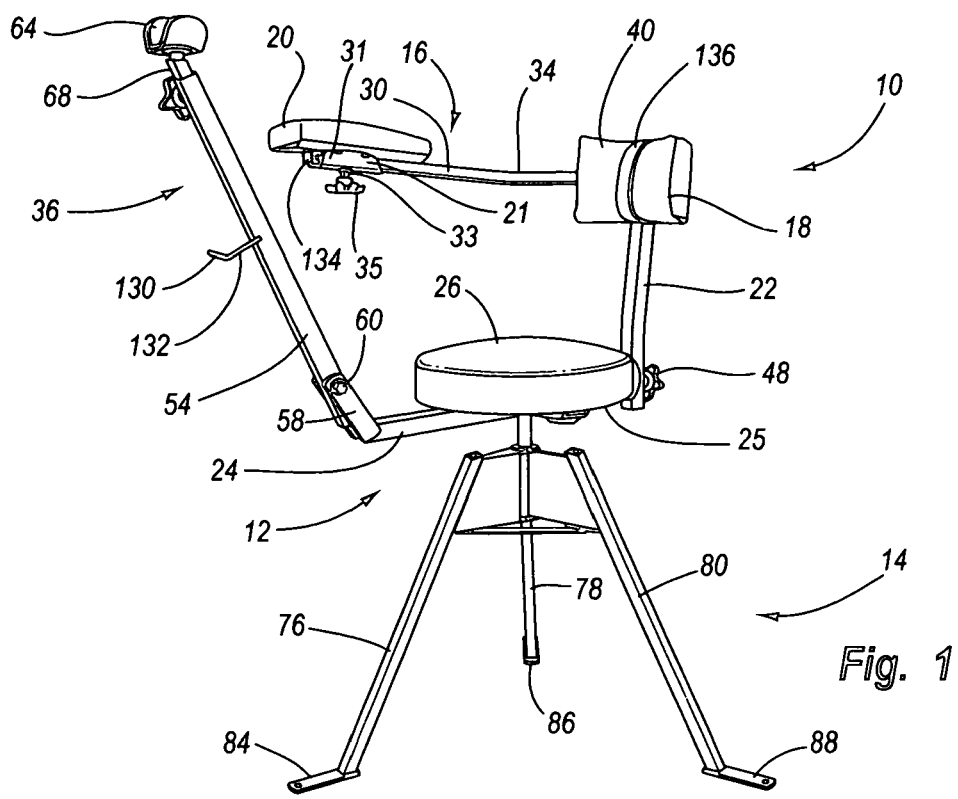
FIG. 1, is a perspective view of a foldable shooting chair of the invention set up for use.

Referring now to the Drawings:

In the illustrated preferred embodiment of the invention, the shooting chair, shown generally at 10 includes a stool, shown generally at 12 and a tripod leg assembly 14.

A support arm 16 includes a back rest 18 and an arm rest 20. The support arm 16 is removably mounted on an upright extending support post 22.

Support post 22 projects upwardly from one end of a seat brace 24 connected to the undersurface 25 of seat 26 (preferably padded) of the stool 12.

Support arm 16 extends from the support post 22 on one side of the padded seat 26 and then is curved a full ninety degrees to extend alongside the seat. Support arm 16 has the back rest 18 secured thereto at an end of one straight extension 30 of the support arm 16. The support arm has straight extensions 30 and 32 extending from opposite ends of a right angle curved bend 34. The support arm 16 curves to extend alongside a user person 38 sitting on the padded seat cushion 26 while straddling a shooting arm 36 and includes the armrest 20 that is adjustable along the length of the extension of the support arm extending alongside the user person 38 sitting in the shooting chair 10. The support arm extensions 30 and 32 extend equi-distantly from the angle bend 34. A sleeve 21 is fixed to the armrest 20 and the sleeve telescopes on the extension 30. A bolt 23 having a knob 25 on one end is threaded through the sleeve 21 to secure the armrest in position on the extension 30. It will be apparent that merely by turning the support arm 16 over and repositioning the armrest 20 from one side of straight extension 30 to the other side of the extension, the support arm can be used for either a right or left handed user person 38 sitting on the padded seat 26.

A padded surface 40 is fixed to back rest 18 and the back rest has a sleeve 42 on a back surface 44 thereof. A bolt 50 is threaded through a wall of sleeve 42 and knob 25 is provided on the end of the bolt. Thus, bolt 23 is threaded out of the wall of sleeve 42 to allow the back rest 18 to slide onto and into position on the support post 22. Bolt 50 is threaded into the sleeve 42 to engage the support post and to secure the back rest 18 in place on the support post 22.

With the back rest 18 lifted off the support post 22, post 22 can be rotated to extend downwardly from the padded seat 26. Support post 22 is released for rotation by first unthreading bolt 46 that is threaded into one end 50 of the seat support brace 24 on the bottom of the padded seat 26. Support post 22 is separated from the end of brace 24 and support post 22 swings from the position extending above the seat cushion to a position extending downwardly from the seat cushion. When support post 22 is rotated to its downwardly extending position, bolt 46 can be tightened to secure the support post 22 in its lowered position.

The shooting arm 36 has a receiver length 54 that is pivotally connected to an upturned end 58 of seat brace 24, which seat brace extends from beneath the padded seat 26. A bolt 60, serving as the pivot connection allows the receiver length 56 of the shooting arm 36 to pivot upwardly towards a user person 38 sitting in the shooting chair 10 and/or downwardly away from such user person. The bolt 60 is tightened to provide a pivot connection that is sufficiently tight that once the receiver length 56 is forcefully positioned by the user person, a set position will be maintained until forcefully changed by the user person. A generally U-shaped, padded cradle end 64 is pivotally mounted to a free end of a telescoping extender 68 that telescopes into and out of the receiver length 56 of the shooting arm 36. The telescoping extender 68 is set relative to the receiver length 56 by a bolt 70 threaded through the receiver length 54 to engage the telescoping extender 68. A knob 72 is provided for turning bolt 70.

The padded seat 26 and the support arm 16 and shooting arm 36 affixed thereto rotate together with respect to the unfolded tripod legs 76, 78 and 80 of the tripod leg assembly 14. The legs 76, 78 and 80 are held in an open or spread position by a latch spring steel arm 82 having a catch 81 on a free end thereof that releasably engages a side of leg 76. The other end 83 of the latch arm is fixed to leg 80. The legs 76, 78 and 80, respectively, have flat feet 84, 86 and 88 projecting from lower ends of the legs.

An interiorly threaded central tube 90 is welded to and extends downwardly from the seat brace 24 on the undersurface 25 of the padded seat 26. A threaded bolt 92 extends through a pair of spaced apart upper and lower washers 94 and 96 and is threaded into the tube 90. The upper and lower washers 94 and 96 are separated by a sleeve 100.

A web 102 is welded to upper and lower ends of leg 78 and to the sleeve 100. The web 102 holds the leg 78 to project outwardly from the sleeve 100 and at a suitable angle.

Leg 76 has a web 104 affixed to an upper end thereof. Web 104 has a top flange 106 projecting therefrom and a hole 108 extends through the flange 106. A similar bottom flange 112 having a hole 114 therethrough projects from web 104 at a lower end of the web.

Leg 80, has a web 118 fixed to and projecting from an upper end of the leg. A flange 120 with a hole 122 therethrough projects from the top of web 118. Another flange 124 having a hole 126 therethrough projects from a bottom of the web 118.

Figure 2:
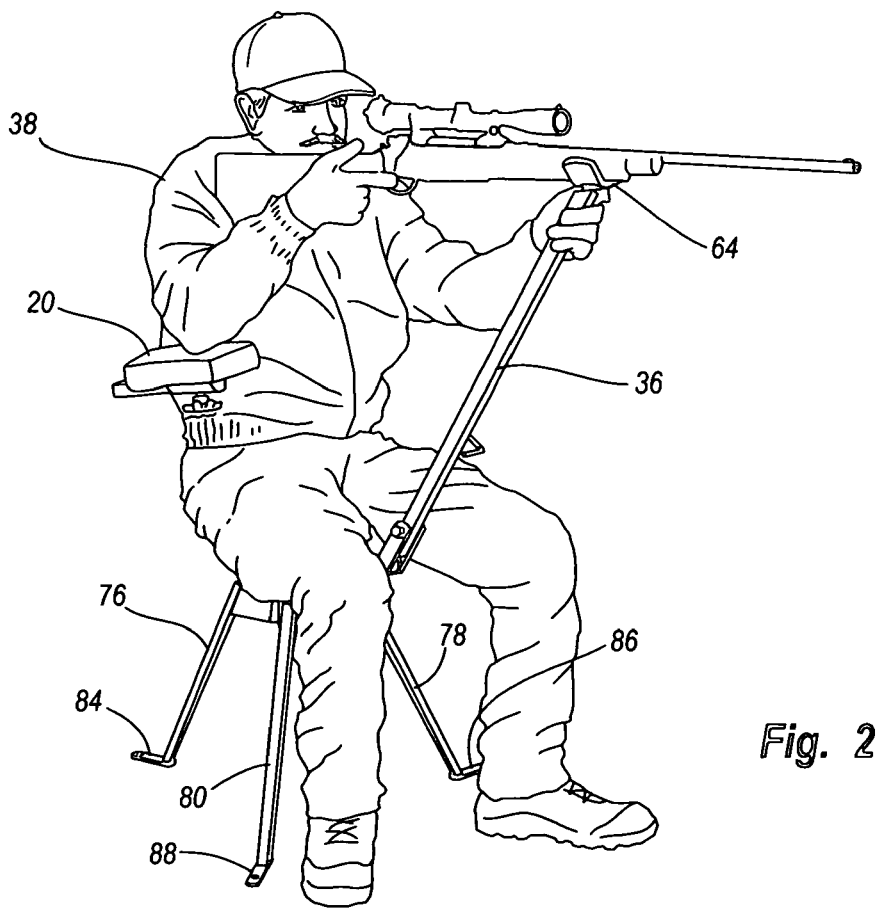
FIG. 2, a perspective view of a person using the foldable shooting chair.
Figure 3:
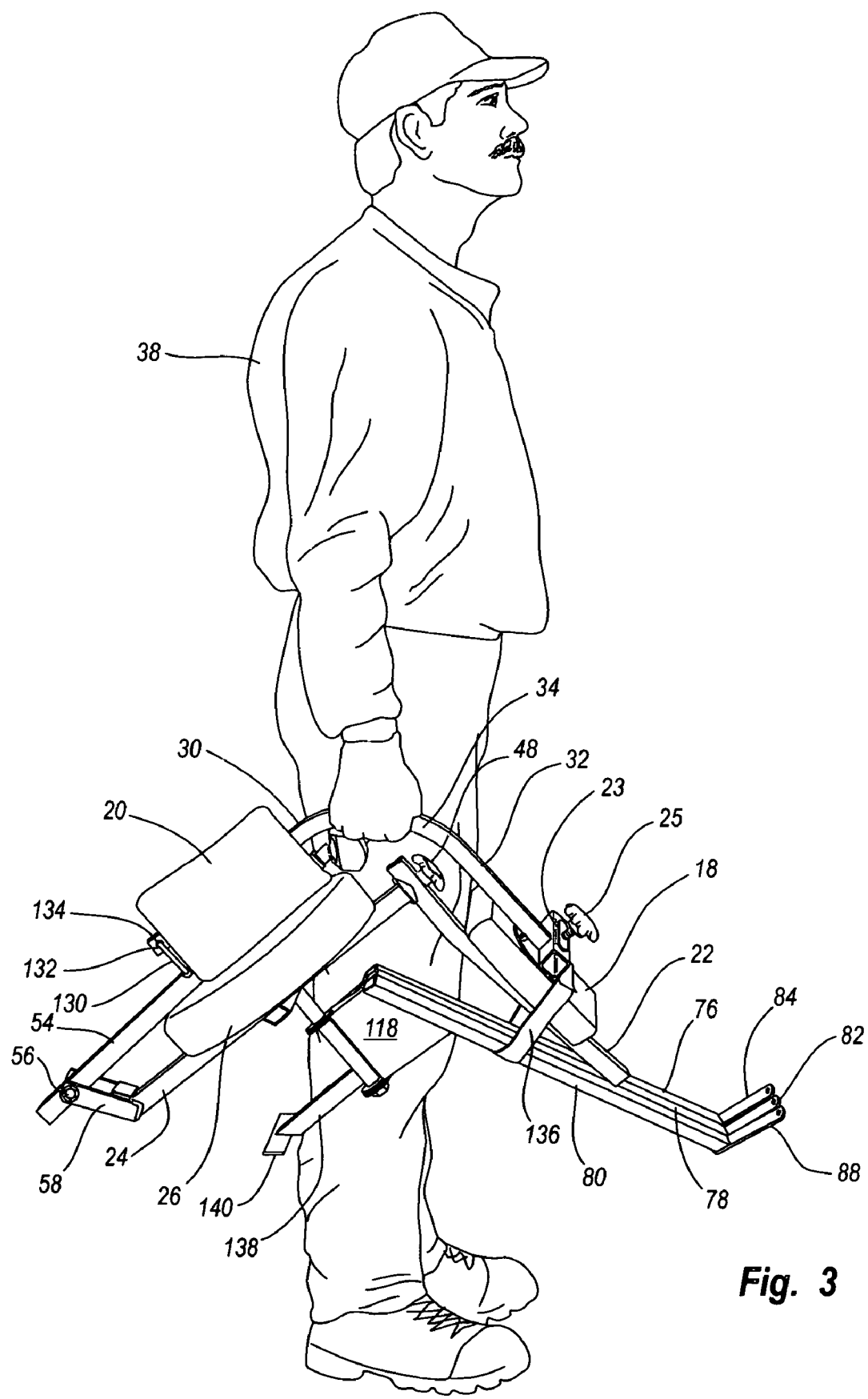
FIG. 3, a perspective view of a person carrying the foldable shooting chair of the invention, the chair having been folded for carrying.
Figure 4:
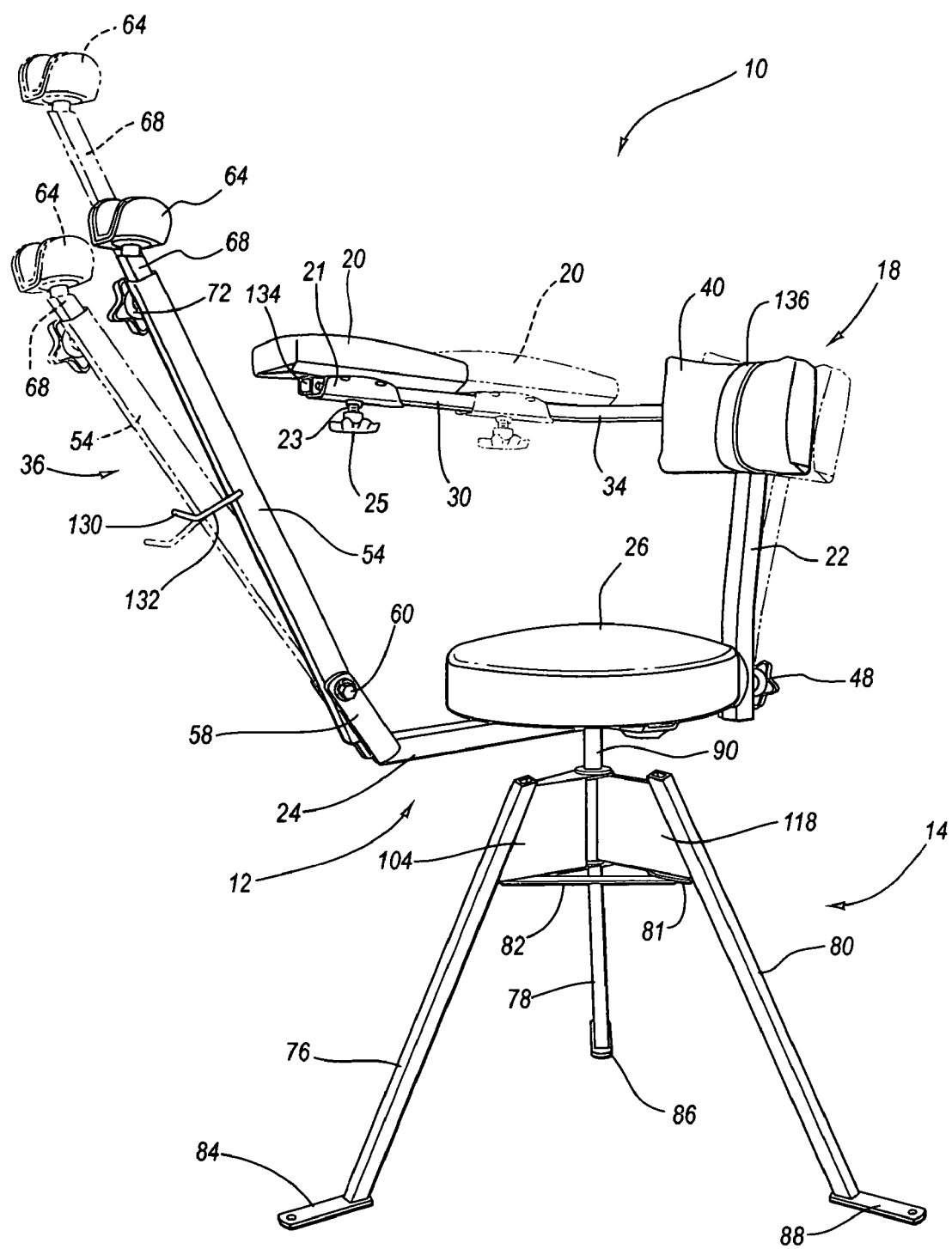
FIG. 4, an enlarged perspective view of the shooting chair and with alternate positions of the shooting arm and of the arm rest on the support arm as set up for a right handed user, shown in phantom.
Figure 5:
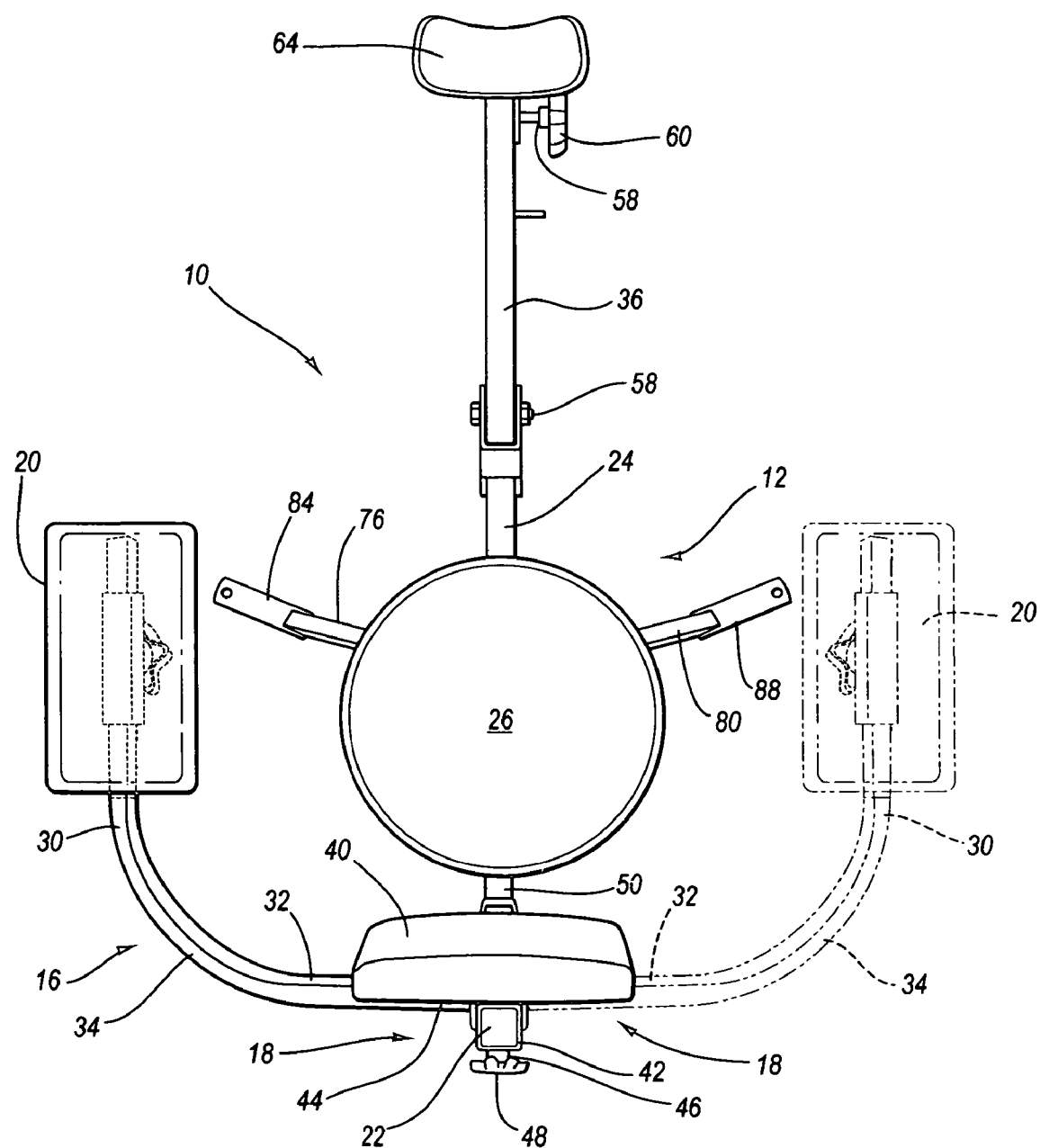
FIG. 5, a top plan view of the shooting chair set up for a right handed user, and with an alternate use position of the arm rests on the support arm and the support arm shown in phantom, set up for a left handed user.
Figure 6A:
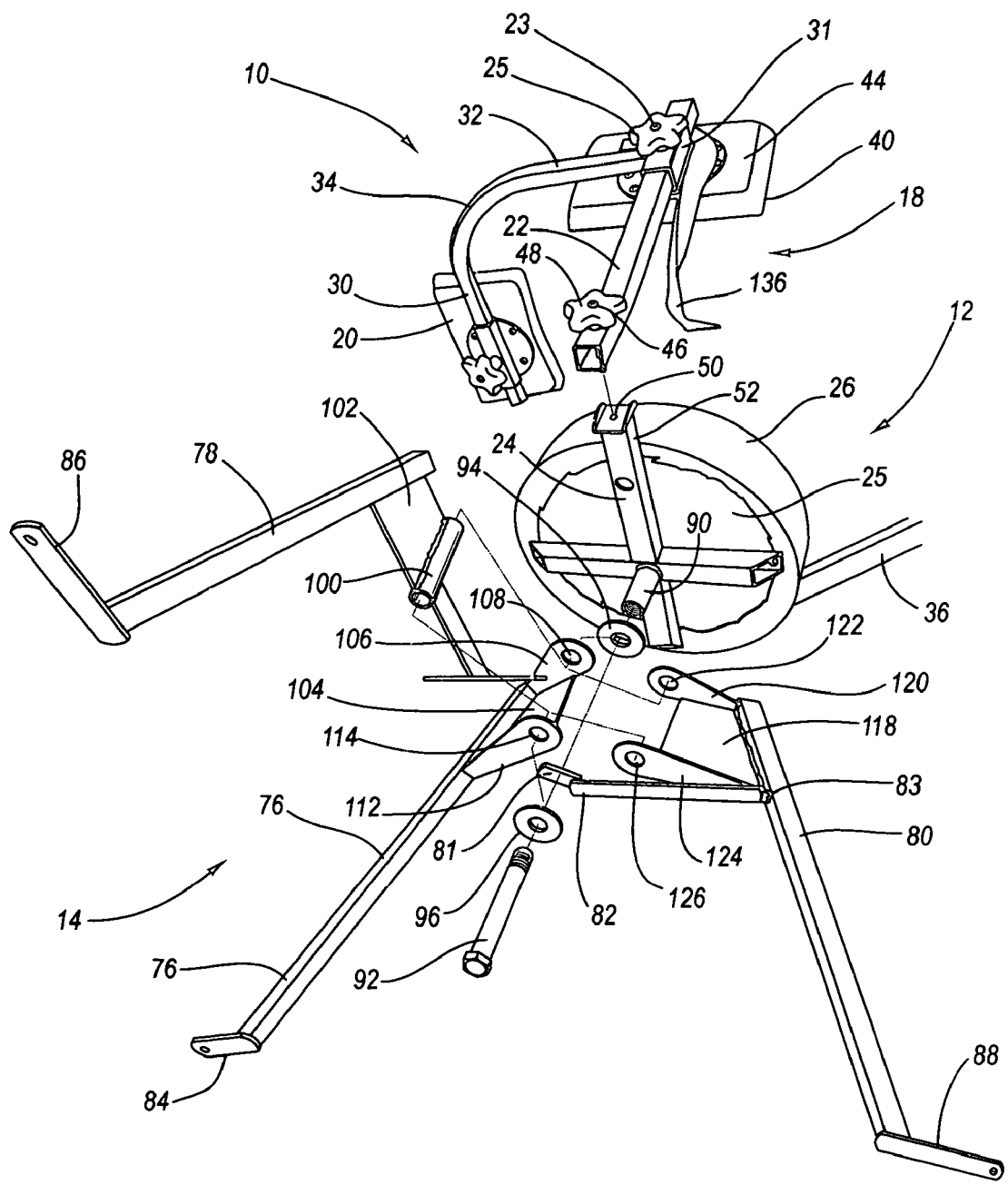
FIG. 6A, an exploded perspective view, showing the underside of the shooting chair.
Figure 6B:
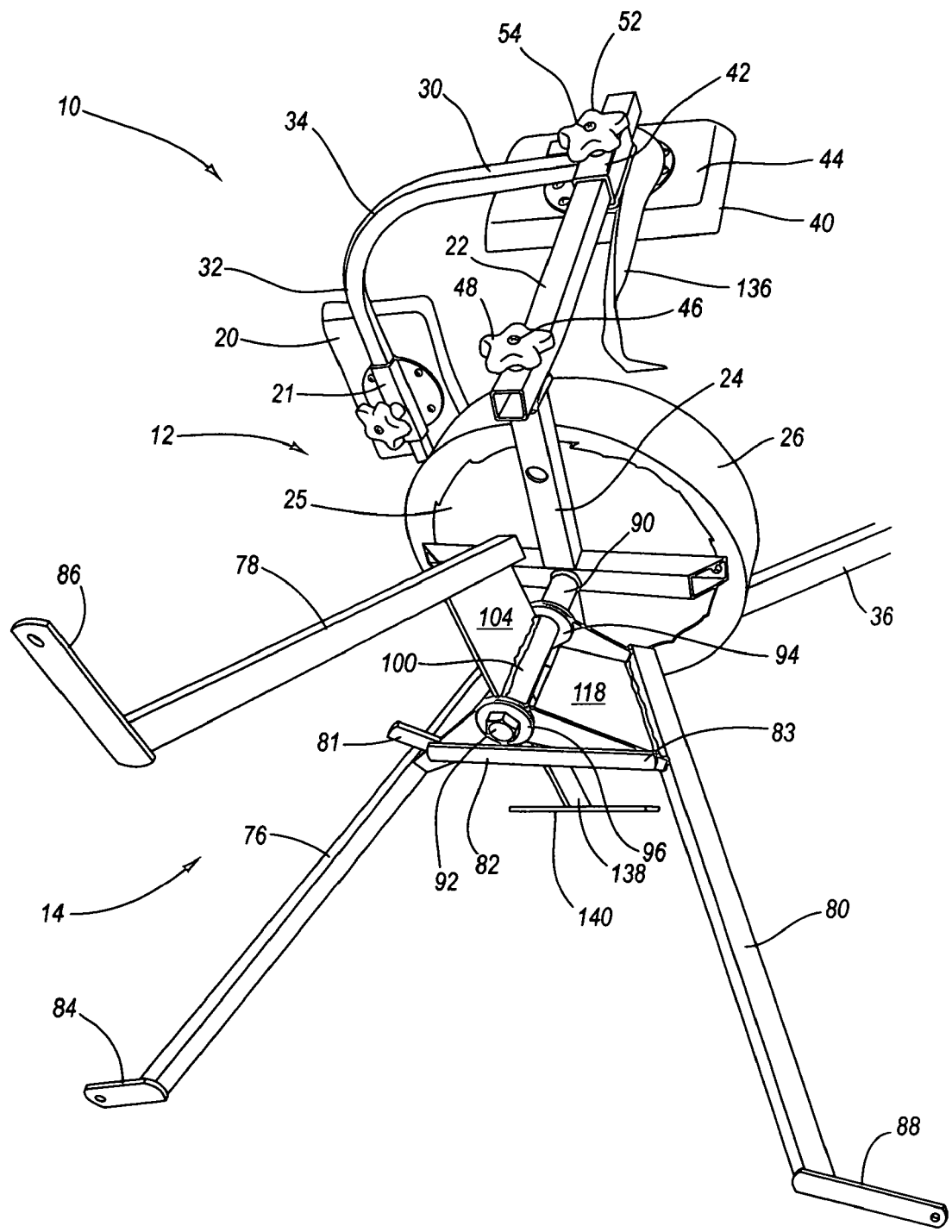
FIG. 6B, a perspective view of the bottom of the shooting chair.
Figure 7A:
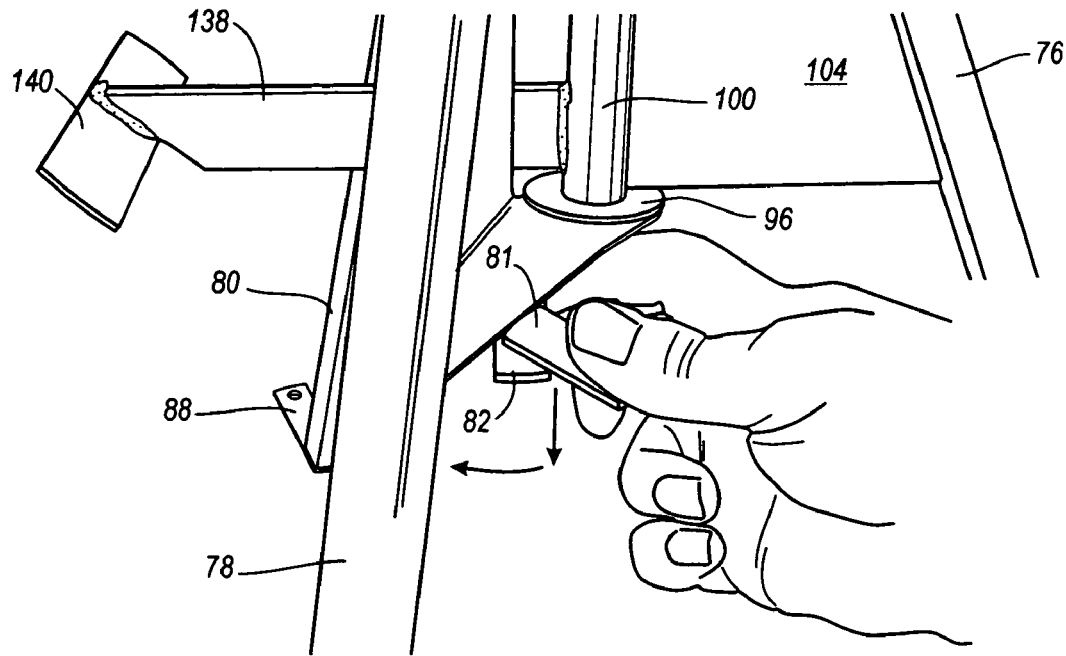
FIG. 7A, a fragmentary, further enlarged perspective view showing the latch structure for holding the legs of the shooting chair open.
Figure 7B:
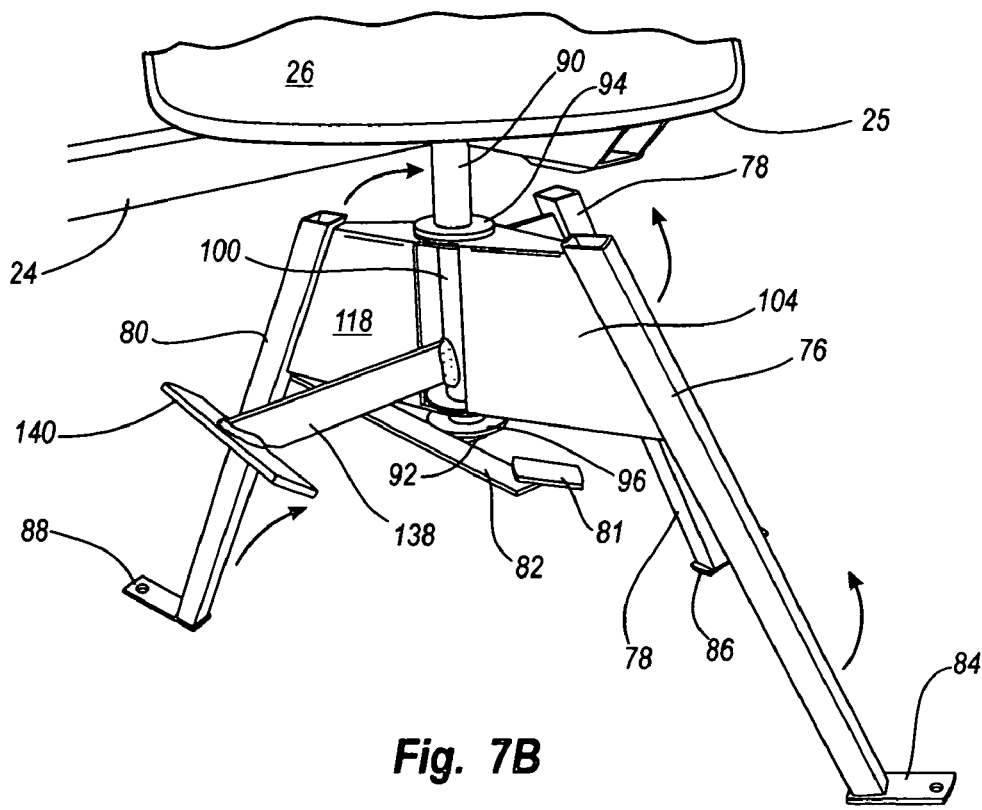
FIG. 7B, a fragmentary perspective view of the leg assembly and showing the seat padding removed and a nut fixed to a top surface of a seat base.
Figure 7C:
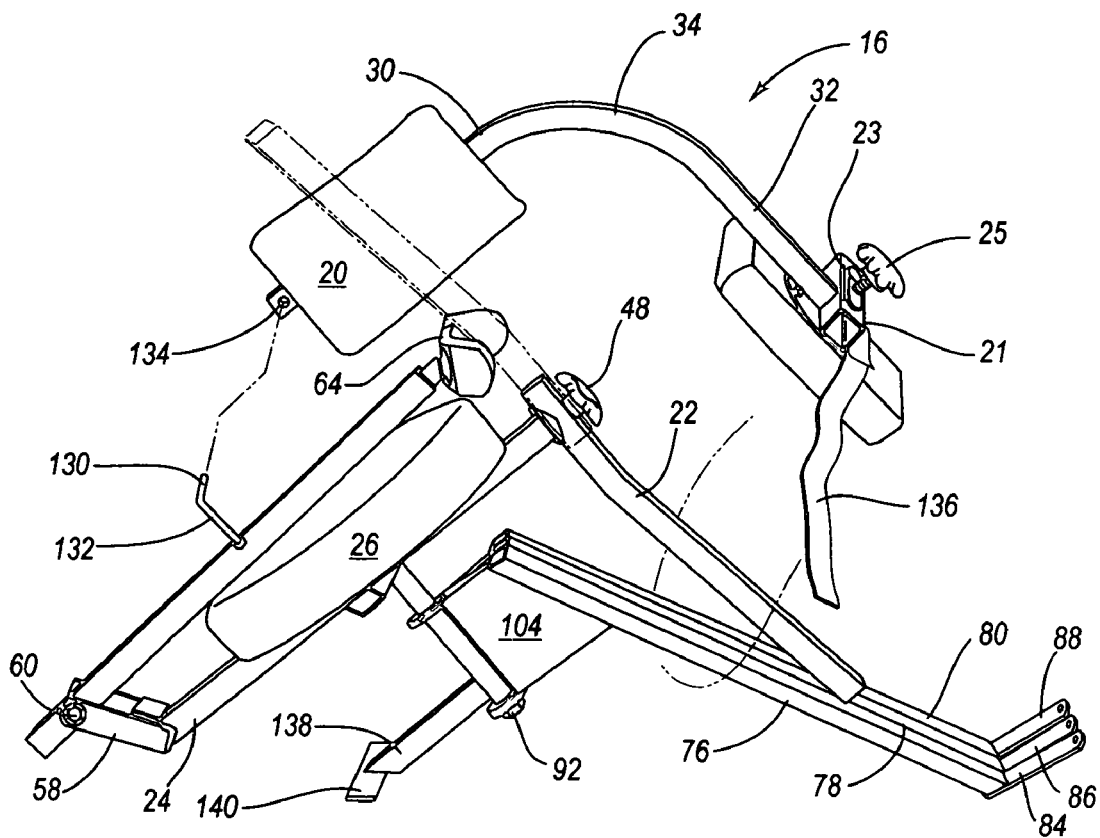
FIG. 7C, a perspective view showing the support arm removed and being repositioned to be a carrying handle for the folded shooting chair.
Figure 7D:
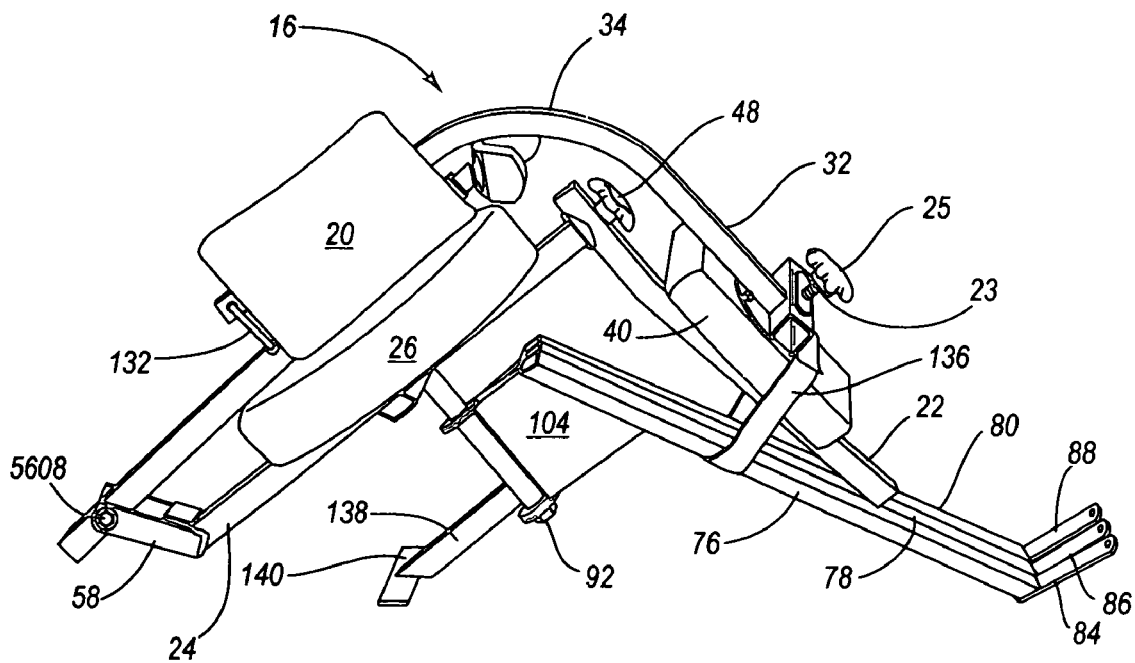
FIG. 7D, a perspective view of the folded shooting chair with the support arm positioned as a carrying handle.

As shown best in FIG. 2, a user person 38 of the assembled and set up shooting chair 10 will straddle the shooting arm 36, will place his back against the seat back rest 18, his firing arm on the armrest 20 and his other hand grasping the support arm 16 beneath the U-shaped cradle end 64. The user will telescope extender 68 into or out of receiver length 54 and then raise and lower the pivoting support arm 16 until a good sight picture is obtained with a target. The user person may then fire as many rounds as desired, with the position of the gun held at the same assigned height.

It will be apparent that either a right handed or a left handed shooter can use the shooting chair 10 equally well. To change the shooting chair, as shown set up for use by a right handed shooter, to fit a left handed shooter, it is only necessary to move the armrest 20 to the opposite side of support arm 16 and to then reposition the support arm 16 with the support arm extending to an opposite side of the padded seat 26.

When a user person is ready to fold the shooting chair 10, the legs 76, 78 and 80 are released from the latch arm 82 and are swung together by pivoting the webs of legs 76 and 80 around the sleeve 100. The legs 76, 78 and 80 are thus pivoted together; the shooting arm 36 is pivoted to be angled over the padded seat 26; and the support arm is removed from the support post 22. The support post 22 is released to swing downwardly towards the leg and then is secured in its downwardly extending position. The support arm 16 is attached to a receiver portion of the shooting arm by inserting the angled finger 130 of a pivot pin 132, through a hole 134. Hole 134 extends through the end of the support arm 16 being secured to the shooting arm, intermediate the length of the shooting arm. The end of the finger 130 is inserted through the hole 134 of the support arm 16 such that the end of the portion of the support arm having the back rest 18 thereon engages the leg 78. A flexible strap 136, affixed to the back rest 18 is wrapped tightly around the legs 76, 78 and 80 and the support arm 16 and is then locked into place with a fastener, such as a hook and loop fastener known by the trademark "VELCRO" on the strap. When the legs 76, 78 and 80 are folded together, the leg 138 can extend downwardly from sleeve 100 to terminate in a foot 140.

When the shooting chair 10 is in a folded condition, the foot 140 and the ends of legs 76, 78 and 80 having feet 84, 86 and 88, respectively thereon will rest on the ground and the shooting chair 10 will be supported above. In this condition, the curved right angle bend 34 of the support arm 16 becomes a handle to be grasped by the user in picking up the foldable shooting chair 10. The support arm 16, has one end affixed to the shooting arm 36 and extends over the top of the shooting chair and is secured to the legs 76, 78 and 80. With the extensions 30 and 32 of the support arm extending respectively downwardly towards the shooting arm and downwardly towards the legs, the shooting chair 10 is balanced to make carrying of the chair easier. By sliding a carrying hand forward or reverse with respect to the curved right angle bend 34 of the carrying handle, the weight of the assembly can be changed to be heavier in front or heavier in back and this will facilitate carrying as a user person traverses irregular ground.

Although preferred forms of my invention have been herein disclosed, it is to be understood that the present disclosure is by way of example and that variations are possible without departing from the subject matter coming within the scope of the following claims, which subject matter I regard as my invention.

We claim:

1. A shooting chair comprising
a seat;
a plurality of legs each having one end connected beneath said seat, centrally of said seat and projecting downwardly and outwardly from said seat;
means mounting said legs whereby one leg receives the other legs folded there against;
means mounting said seat to be rotatably supported above the legs;
a seat back fixed to and rotatable with said seat at one side of said seat;
a shooting arm having one end connected to a bottom of said seat at an opposite side of said seat;
means mounting said shooting arm to swing upwardly and downwardly with respect to said seat at said opposite side of said seat;
a support post connected to the bottom of said seat and extending upwardly from said one side of said seat;
means mounting said seat back on said support post;
means to releasably lock said legs equi-distantly spaced apart;
a support arm having a curved right angle bend intermediate its length a pair of extensions projecting equidistantly from opposite ends of said bend; and
means for releasably attaching an end of an extension of said support arm to said shooting arm when said support arm is removed from said support post.

2. A shooting chair as in claim 1, further including
strap means connected to said seat back and including a strap when said legs are folded together to extend around the legs and means for releasably securing ends of said strap.

3. A shooting chair as in claim 1, wherein the means mounting said legs includes means whereby one leg receives the other legs folded there against and wherein
the plurality of legs form a tripod base for the chair; and includes an interiorly threaded tube fixed to and projecting from said base;
a sleeve beneath said tube;
a first web fixed to said sleeve and having one said leg fixed thereto;
a second web having top and bottom flanges with holes therethrough and another of said legs fixed to said second web;
a third web having top and bottom flanges with holes therethrough and another said leg fixed to said third web; and
a threaded bolt extending through said bottom flanges, said sleeve and said top flanges and threaded into said tube.

4. A shooting chair as in claim 3, further including
a support leg projecting from the sleeve at a side opposite the first web; and
a foot on an end of said support leg remote from said sleeve.

5. A shooting chair comprising a seat;

a plurality of legs each having one end connected beneath said seat centrally of said seat and projecting downwardly and outwardly from said seat;

means mounting said legs whereby one leg receives the other legs folded there against;

means mounting said seat to be rotatably supported above the legs;

a seat back fixed to and rotatable with said seat at one side of said seat;

a shooting arm having one end connected to a bottom of said seat at an opposite side of said seat;

means mounting said shooting arm to swing upwardly and downwardly with respect to said seat at said opposite side of said seat;

a support arm having a curved right angle bend intermediate its length and a pair of extensions projecting equidistantly from opposite ends of said bend; and means removably connecting either one of said extensions to said seat back.

6. A shooting chair as in claim 5, further including an armrest connected to the other of said extensions.

7. A shooting chair as in claim 5, wherein another end of the shooting arm has a cradle thereon to receive a barrel of a long gun.

8. A shooting chair as in claim 5, further including a support post connected to the bottom of said seat and extending upwardly from said one side of said seat; and means mounting said seat back on said support post.

9. A shooting chair as in claim 8, further including means to releasably lock said legs equi-distantly spaced apart.

* * * * *